United States Patent
Sawai et al.

(10) Patent No.: US 10,824,217 B2
(45) Date of Patent: *Nov. 3, 2020

(54) STORAGE AND STORAGE SYSTEM

(71) Applicant: Toshiba Memory Corporation, Minato-ku, Tokyo (JP)

(72) Inventors: Naoki Sawai, Yokohama Kanagawa (JP); Hiroshi Murayama, Yokohama Kanagawa (JP); Hiroshi Nishimura, Hachioji Tokyo (JP); Shinichi Kanno, Tokyo (JP); Hideki Yoshida, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 4 days.

This patent is subject to a terminal disclaimer.

(21) Appl. No.: 16/226,769

(22) Filed: Dec. 20, 2018

(65) Prior Publication Data

US 2019/0121418 A1 Apr. 25, 2019

Related U.S. Application Data

(63) Continuation of application No. 14/921,708, filed on Oct. 23, 2015, now Pat. No. 10,198,061.

(Continued)

(51) Int. Cl.
*G06F 1/26* (2006.01)
*G06F 1/32* (2019.01)
(Continued)

(52) U.S. Cl.
CPC .......... *G06F 1/3221* (2013.01); *G06F 1/3268* (2013.01); *G06F 3/06* (2013.01);
(Continued)

(58) Field of Classification Search
CPC combination set(s) only.
See application file for complete search history.

(56) References Cited

U.S. PATENT DOCUMENTS 8,032,768 B2  10/2011  Brundridge et al.
8,239,701 B2  8/2012  Day et al.
(Continued)

FOREIGN PATENT DOCUMENTS

JP  2011-28720 A  2/2011
JP  2011-227664 A  11/2011
(Continued)

OTHER PUBLICATIONS

Xiao-Yu Hu et al., "Write Amplification Analysis in Flash-Based Solid State Drives," SYSTOR '09 Proceedings of SYSTOR 2009: The Israeli Experimental Systems Conference, May 4, 2009, ACM.
(Continued)

*Primary Examiner* — Phil K Nguyen
(74) *Attorney, Agent, or Firm* — White & Case LLP

(57) ABSTRACT

According to one embodiment, a storage includes a nonvolatile memory and a controller configured to control the nonvolatile memory. The storage is supplied with first power from a power supply unit. The controller is configured to change power supplied from the power supply unit from the first power to second power based on a power control command transmitted from a host. The power control command includes a first parameter identifying the storage and a second parameter indicative of the second power.

11 Claims, 14 Drawing Sheets

Related U.S. Application Data

(60) Provisional application No. 62/212,964, filed on Sep. 1, 2015.

(51) Int. Cl.
*G06F 1/3221* (2019.01)
*G06F 1/3234* (2019.01)
*G06F 3/06* (2006.01)

(52) U.S. Cl.
CPC .......... *G06F 3/0625* (2013.01); *G06F 3/0634* (2013.01); *G06F 3/0688* (2013.01); *G06F 1/26* (2013.01); *Y02D 10/154* (2018.01)

(56) References Cited

U.S. PATENT DOCUMENTS

| | | | |
|---|---|---|---|
| 8,327,166 | B2 | 12/2012 | Day |
| 8,418,042 | B2 | 4/2013 | Kanno |
| 8,443,263 | B2 | 5/2013 | Selinger et al. |
| 8,700,932 | B2 | 4/2014 | Belluomini et al. |
| 8,738,994 | B2 | 5/2014 | Cho et al. |
| 9,372,529 | B1 | 6/2016 | Klein |
| 2005/0067902 | A1 | 3/2005 | Bemat et al. |
| 2005/0144486 | A1 | 6/2005 | Komarla et al. |
| 2006/0053338 | A1 | 3/2006 | Cousins et al. |
| 2007/0168605 | A1 | 7/2007 | Takai et al. |
| 2008/0010521 | A1* | 1/2008 | Goodrum .............. G06F 1/3203 714/22 |
| 2008/0266698 | A1 | 10/2008 | Shibayama et al. |
| 2009/0235042 | A1 | 9/2009 | Petrocelli |
| 2009/0316541 | A1 | 12/2009 | Takada et al. |
| 2010/0057991 | A1 | 3/2010 | Yoshida et al. |
| 2010/0146333 | A1 | 6/2010 | Yong et al. |
| 2010/0332858 | A1 | 12/2010 | Trantham et al. |
| 2011/0191501 | A1 | 8/2011 | Jang et al. |
| 2011/0208911 | A1 | 8/2011 | Taguchi et al. |
| 2011/0258367 | A1 | 10/2011 | Tanaka et al. |
| 2011/0314204 | A1 | 12/2011 | Ootsuka et al. |
| 2013/0124888 | A1 | 5/2013 | Tanaka et al. |
| 2013/0232310 | A1 | 9/2013 | Kruus |
| 2013/0254773 | A1 | 9/2013 | Kimura et al. |
| 2013/0318371 | A1 | 11/2013 | Hormuth |
| 2014/0013050 | A1 | 1/2014 | Matsukawa et al. |
| 2014/0101379 | A1 | 4/2014 | Tomlin |
| 2014/0218767 | A1 | 8/2014 | Hamaguchi |
| 2014/0298047 | A1* | 10/2014 | Holler .................... G06F 1/329 713/300 |
| 2014/0379963 | A1 | 12/2014 | Kazama |
| 2015/0309952 | A1 | 10/2015 | Breakstone et al. |
| 2015/0357005 | A1 | 12/2015 | Shim et al. |
| 2016/0041762 | A1 | 2/2016 | Kanno et al. |

FOREIGN PATENT DOCUMENTS

| | | |
|---|---|---|
| JP | 2012-108757 A | 6/2012 |
| JP | 2013-89138 A | 5/2013 |
| JP | 2013-097635 A | 5/2013 |
| JP | 2013-225297 A | 10/2013 |
| JP | 2014-016733 A | 1/2014 |
| JP | 2014-186418 A | 10/2014 |

OTHER PUBLICATIONS

Amber Huffman, "NVM Express 1.1," Oct. 11, 2012, Intel Corporation.
International Search Report and Written Opinon dated Feb. 11, 2015 in International Application No. PCT/IB2015/056002.
Taiwanese Office Action dated Feb. 17, 2016 in corresponding Taiwanese application No. 103139433.
Non-Final Office Action received in U.S. Appl. No. 14/817,625 dated Oct. 6, 2016.

* cited by examiner

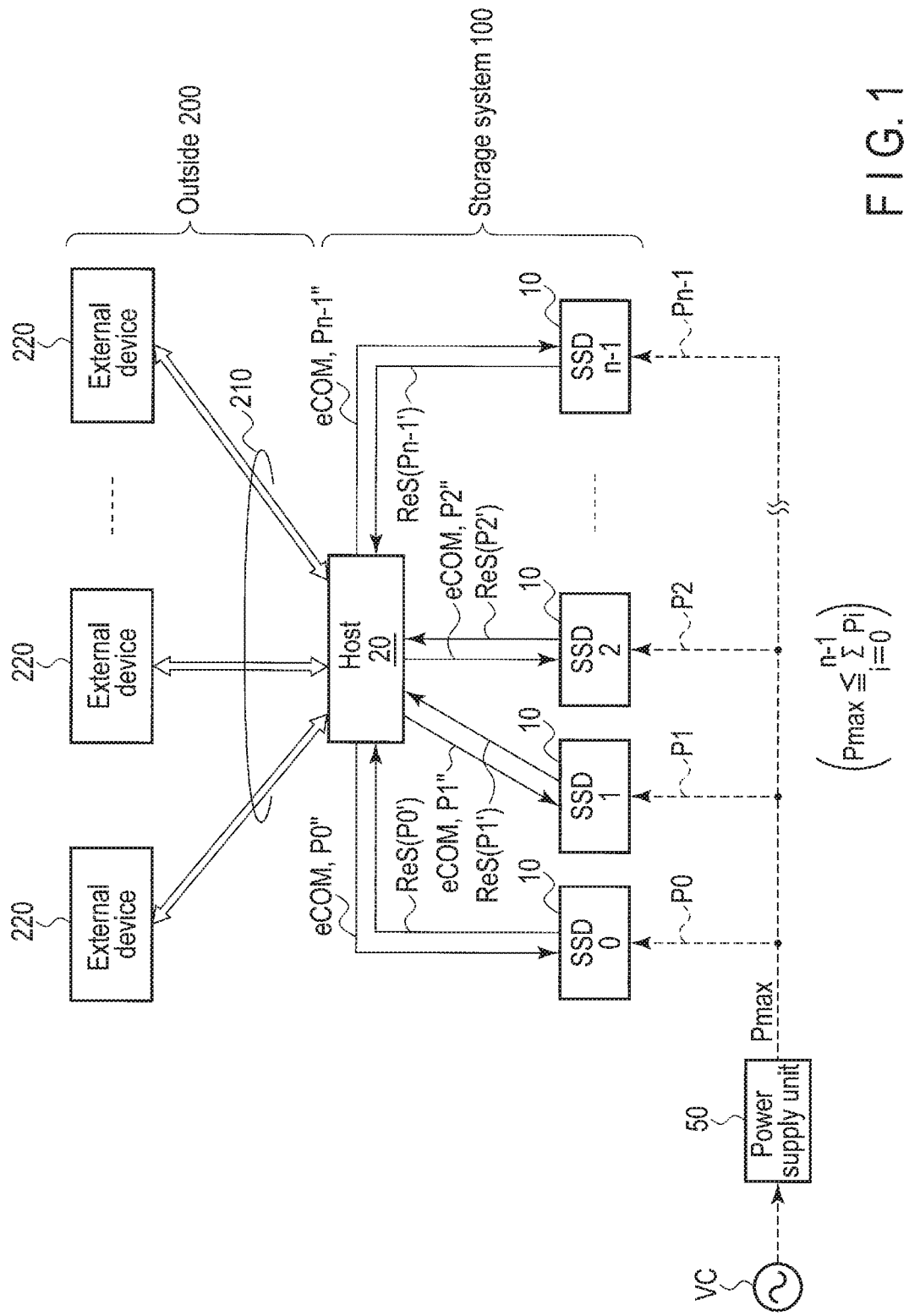
F I G. 1

Table T1

| Storage device | Power/performance characteristic |
|---|---|
| SSD 0 | PP0 |
| SSD 1 | PP1 |
| SSD 2 | PP2 |
| SSD 3 | PP3 |
| SSD 4 | PP4 |
| SSD 5 | PP5 |
| SSD 6 | PP6 |
| SSD 7 | PP7 |
| SSD 8 | PP8 |
| SSD 9 | PP9 |

F I G. 3

Updated table T1

| Memory system | Power/performance characteristic | Corrected power/performance characteristic | Allowable power | Changed power |
|---|---|---|---|---|
| SSD 0 | PP0 | PP0' | P0" | P0" |
| SSD 1 | PP1 | PP1' | P1" | P1" |
| SSD 2 | PP2 | PP2' | P2" | P2" |
| SSD 3 | PP3 | PP3' | P3" | P3" |
| SSD 4 | PP4 | PP4' | P4" | P4" |
| SSD 5 | PP5 | PP5' | (P5) | P5'" (=P5+{AP0~AP4,AP6~AP9}) |
| SSD 6 | PP6 | PP6' | P6" | P6" |
| SSD 7 | PP7 | PP7' | P7" | P7" |
| SSD 8 | PP8 | PP8' | P8" | P8" |
| SSD 9 | PP9 | PP9' | P9" | P9" |

F I G. 7

First embodiment

Comparative example

Table T3 (modified example 1)

| Storage device | Log |
|---|---|
| SSD 0 | (S01, P01), (S02, P02), ⋯ |
| SSD 1 | (S11, P11), (S12, P12), ⋯ |
| SSD 2 | (S21, P21), (S22, P22), ⋯ |
| SSD 3 | (S31, P31), (S32, P32), ⋯ |
| SSD 4 | (S41, P41), (S42, P42), ⋯ |
| SSD 5 | (S51, P51), (S52, P52), ⋯ |
| SSD 6 | (S61, P61), (S62, P62), ⋯ |
| SSD 7 | (S71, P71), (S72, P72), ⋯ |
| SSD 8 | (S81, P81), (S82, P82), ⋯ |
| SSD 9 | (S91, P91), (S92, P92), ⋯ |

F I G. 16

STORAGE AND STORAGE SYSTEM

CROSS-REFERENCE TO RELATED APPLICATIONS

This application is a continuation of application Ser. No. 14/921,708 filed Oct. 23, 2015 and is based upon and claims the benefit of U.S. Provisional Application No. 62/212,964, filed Sep. 1, 2015, the entire contents of which are incorporated herein by reference.

FIELD

Embodiments relate generally to a storage device and a storage system.

BACKGROUND

There is a storage system including a nonvolatile memory and having a control function of controlling the nonvolatile memory.

BRIEF DESCRIPTION OF THE DRAWINGS

FIG. 1 is a block diagram showing a general structure of a storage system of the first embodiment.

FIG. 3 is a table showing a table T1 of the first embodiment.

FIG. 7 is a table showing the updated table T1.

FIG. 16 is a table showing a table T3 of modified example 1.

DETAILED DESCRIPTION

Figure 2:
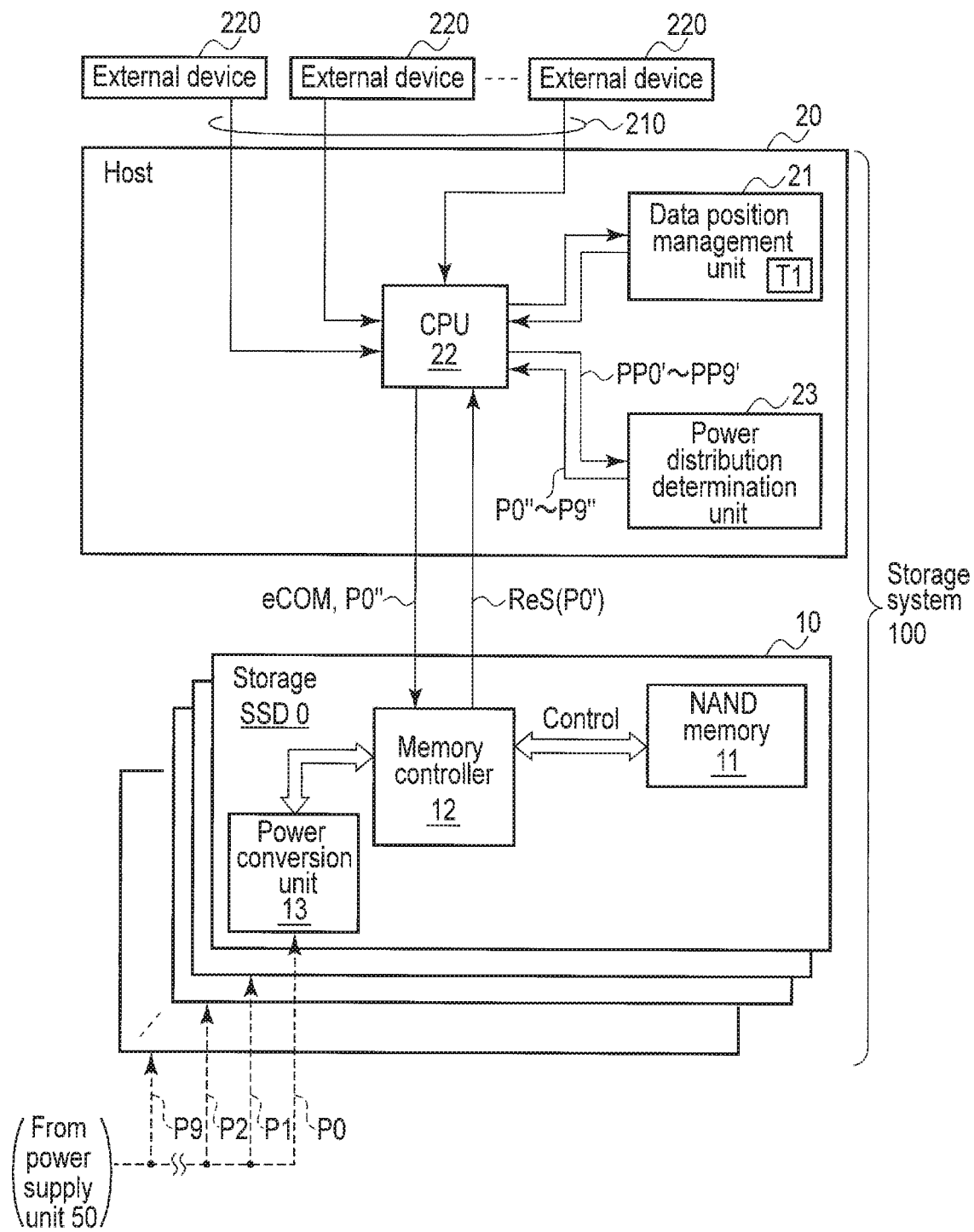
FIG. 2 is a block diagram showing a detailed structure of the storage system of the first embodiment.

In general, according to one embodiment, a storage includes a nonvolatile memory and a controller configured to control the nonvolatile memory. The storage is supplied with first power from a power supply unit. The controller is configured to change power supplied from the power supply unit from the first power to second power based on a power control command transmitted from a host. The power control command includes a first parameter identifying the storage and a second parameter indicative of the second power.

Various embodiments will be described hereinafter with reference to the accompanying drawings. In the description below, the approximately-same functions and elements are represented by the same reference numbers and their description is provided if necessary. In the specification, some elements are exemplarily expressed by various expressions. These expressions are just an example and do not deny that the above elements are expressed by other expressions.

First Embodiment

[1. Structure]

[1-1. General Structure]

A general structure including a storage system 100 of the first embodiment is described with reference to FIG. 1. FIG. 1 represents power paths by broken lines and signal paths by solid lines.

As shown in FIG. 1, the storage system 100 of the first embodiment is driven by power Pmax supplied from a power supply unit 50, and executes a process and request (for example, a request to write data, etc.) of external devices 220 which access the storage system 100 from the outside 200 via a network 210.

The storage system 100 comprises SSD0 to SSDn-1 (n is a natural number), which are storage devices 10, and a host 20 which controls the storage devices 10. Solid-state drives (SSDs) are described as an example of the storage devices 10. The storage devices 10 are not limited to SSDs and may be, for example, hard disc drives (HDDs) or other storage devices and memories. The detailed structure of the storage devices 10 and the host 20 will be described later.

The power supply unit 50 converts external power supplied from an external power source VC to the predetermined power Pmax. The converted power Pmax is almost equally divided into power components P0 to Pn-1 to be supplied to the storage devices 10, respectively. In the first embodiment, the total power Pmax supplied to the storage system 100 is predetermined and the value is substantially constant. Therefore, the value of power Pmax supplied from the power supply unit 50 is not greater than the sum total of power components P0 to Pn-1 supplied to SSD0 to SSDn-1, respectively, that is $$P\max \leq \Sigma Pi, \qquad (I)$$

where i=0, 1, 2, . . . , n−1.

The external devices 220 access the storage system 100 from the outside 200 of the storage system 100 via the network 210, and performs a predetermined process or makes a predetermined request (for example, data reading, data writing, data erasing, etc.) to the accessed storage system 100. The network 210 is not limited to wired or wireless.

In the above structure, the storage system 100 of the first embodiment changes power components to be distributed to the storage devices 10 and optimizes the power components (P0 to Pn-1→P0" to Pn-1") in accordance with a load on the storage devices 10 (SSD0 to SSDn-1). According to such a structure, the storage system 100 of the first embodiment can improve efficiency of the system. The effect and advantage will be described later in detail.

[1-2. Storage System]

The detailed structure of the storage system 100 of the first embodiment is described with reference to FIG. 2. As described above, the storage system 100 comprises SSD0 to SSDn−1, which are the storage devices 10, and the host 20 which controls the storage devices 10. In the description below, the storage system 100 comprises ten SSDs, i.e., SSD0 to SSD9 (n=10), as an example.

[Storage Device]

Each of SSD0 to SSD9, which are the storage devices 10, comprises a NAND flash memory (hereinafter referred to as a NAND memory) 11, a memory controller 12 and a power conversion unit 13.

The NAND memory 11 is a nonvolatile semiconductor memory which comprises blocks (physical blocks) and stores data in each block. Each block comprises memory cells positioned at intersections of word lines and bit lines. Each memory cell comprises a control gate and a floating gate and stores data in a nonvolatile manner by the presence or absence of electrons injected into the floating gate. The word lines are commonly connected to the control gates of the memory cells. A page exists in each word line. Data reading and writing operations are performed per page. Therefore, a page is a unit of data reading and writing. Data is erased per block. Therefore, a block is a unit of data erasing. The NAND memory 11 of the first embodiment may be multi-level cell (MLC) capable of storing multibit data in a memory cell or single-level cell (SLC) capable of storing one-bit data in a memory cell MC.

The memory controller 12 controls the operation of the whole of the storage device 100 in accordance with a request from the host 20. For example, the memory controller 12 writes write data to a predetermined address of the NAND memory 11 in accordance with a write command which is a request to write data from the host 20. The memory controller 12 of the first embodiment further receives an extended request eCOM transmitted from the host 20 to confirm minimum power required for the operation of each of SSD0 to SSD9. The extended request eCOM is a signal transmitted on purpose to detect various states of the storage device 10 (for example, a state of power consumption of the storage device 10 in this case), and is defined as a signal different from the above-described write command, etc. The extended request eCOM is not limited to a command eCOM and may be any extended predetermined signal (information, request, instruction, etc.).

The memory controller 12 of each of SSD0 to SSD9 transmits a status signal ReS (P0' to P9') indicative of the minimum power required for the operation in reply to the received request eCOM. In the present embodiment, for example, the minimum power required for the operation is described in each status signal ReS (P0' to P9') by a predetermined parameter, etc. The signal transmitted in reply is not limited to the status signal ReS and may be any extended predetermined signal (information, request, instruction, etc.).

The memory controller 12 of each of SSD0 to SSD9 controls the power conversion unit 13 to operate based on the changed power component (P0" to P9") notified by the host 20. The operation will be described later in detail.

The power conversion unit 13 converts the power component (P0 to P9) supplied from the power supply unit 50 under the control of the memory controller 12. The storage device 10 performs a predetermined operation in accordance with the power supplied from the power conversion unit 13.

Of course, the storage devices 10 are not limited to the above-described structure. For example, each memory controller 12 may comprise an address mapping table indicative of a correspondence relationship between logical addresses managed by the host 20 and physical addresses managed by the storage device 10. There is no order as to which of the extended command eCOM and the extended status signal ReS should be transmitted first. That is, the extended predetermined signal may be first transmitted from the storage device 10 to the host 20 and then the extended predetermined signal may be transmitted from the host 20 to the storage device 10.

[Host]

The host 20 controls each storage device 10 in accordance with a request from the external devices 220 which access from the outside via the network 210. The host 20 comprises a data position management unit 21, a power distribution determination unit 23 and a central processing unit (CPU) 22.

The data position management unit 21 manages, for example, position information of write data stored in the storage devices 10 under the control of the CPU 22. The data position management unit 21 comprises a table (first table) T1. Table T1 indicates at least a power/performance characteristic of each of SSD0 to SSD9 as described later.

The power distribution determination unit 23 determines power to be distributed to each of SSD0 to SSD9 under the control of the CPU 22. More specifically, the power distribution determination unit 23 determines power components P0" to P9" to be redistributed to SSD0 to SSD9, respectively, based on the corrected characteristics PP0' to PP9' of the storage devices 10 transmitted from the CPU 22. The CPU 22 is notified of the determined power components P0" to P9".

The CPU 22 controls the data position management unit 21 and the power distribution determination unit 23 and controls the operation of the whole of the host 20.

Of course, the host 20 is not limited to the above-described structure. For example, the host 20 may comprise an interface to communicate with the storage devices 10, etc.

[1-3. Table T1]

Table T1 of the first embodiment is described in detail with reference to FIG. 3 and FIG. 4. FIG. 3 is a table showing table T1 of the first embodiment.

As shown in FIG. 3, SSD0 to SSD9, which are the storage devices 10, are associated with theoretical power/performance characteristics (electrical characteristics) PP0 to PP9, respectively, in table T1. Each of power/performance characteristics PP0 to PP9 is shown as a typical characteristic based on the assumption that the performance varies depending on the amount of supplied power.

Figure 4:
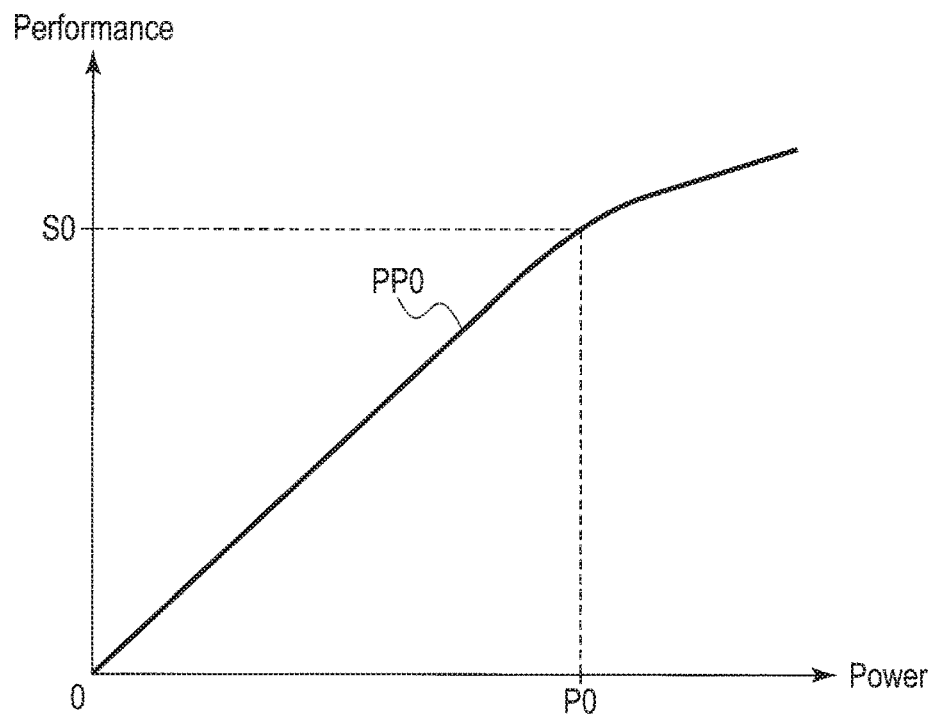
FIG. 4 is a graph showing an example of theoretical power/performance characteristics of the storage system of the first embodiment.

For example, FIG. 4 shows a power/performance characteristic PP0 of SSD0. As shown in FIG. 4, in characteristic PP0, the performance increases from the origin 0 proportionately with the supplied power in theory. More specifically, when the supplied power is power component P0, SSD0 can deliver performance S0 proportionately with power component P0. However, a proportionality coefficient of the performance decreases when the supplied power increases to some degree. For example, when the supplied power exceeds power component P0, the proportionality coefficient of the performance decreases. This is because, for example, the amount of heat produced in the controller 12 increases when the supplied power increases to some degree.

The performance (performance index) may include all operations and functions performed by the NAND memory 11 depending on the supplied power. For example, the performance of the NAND memory 11 may include data writing, data reading, data erasing, garbage collection (compaction), inputs/outputs per second (IPOS), megabytes per second (MB/s), etc. IPOS is the number of times data can be written to the NAND memory 11 per second. MB/s is a communication speed between the host 20 and the NAND memory 11. Power/performance characteristics PP1 to PP9 of the other SSD1 to SSD9 are the same as PP0.

[2. Operation]

Next, the operation of the storage system 100 of the first embodiment having the above structure is described.

[2-1. Distribution Power Determination Process]

A distribution power determination process of the storage system 100 of the first embodiment is described with reference to FIG. 5. As an example, the description below is based on the assumption that a specified SSD5 is intensively accessed by the external devices 220 and the CPU 22 of the host 20 determines that the larger load (larger power) is necessary for SSD5.

First, in step S11, the CPU 22 of the host 20 transmits an extended request (first request) eCOM to confirm the minimum power required for the operation of each of SSD0 to SSD9.

In step S12, the memory controller 12 of each storage device 10 transmits a status signal ReS (P0' to P9') indicative of the minimum power required for the operation in reply to the received request eCOM. For example, the memory controller 12 of SSD0 first detects the minimum power component P0' required for the operation of the NAND memory 11 of SSD0 based on the relationship between the performance and power component P0 supplied to the NAND memory 11, in accordance with the received request eCOM. Next, the memory controller 12 of SSD0 transmits the detected minimum power component P0' to the host 20 as a status signal ReS (P0'). A first parameter (identification information) to identify SSD0 to SSD9, which are the storage devices 10, is assigned to the status signal ReS. The first parameter is, for example, ID information uniquely assigned to each of SSD0 to SSD9.

Figure 6:
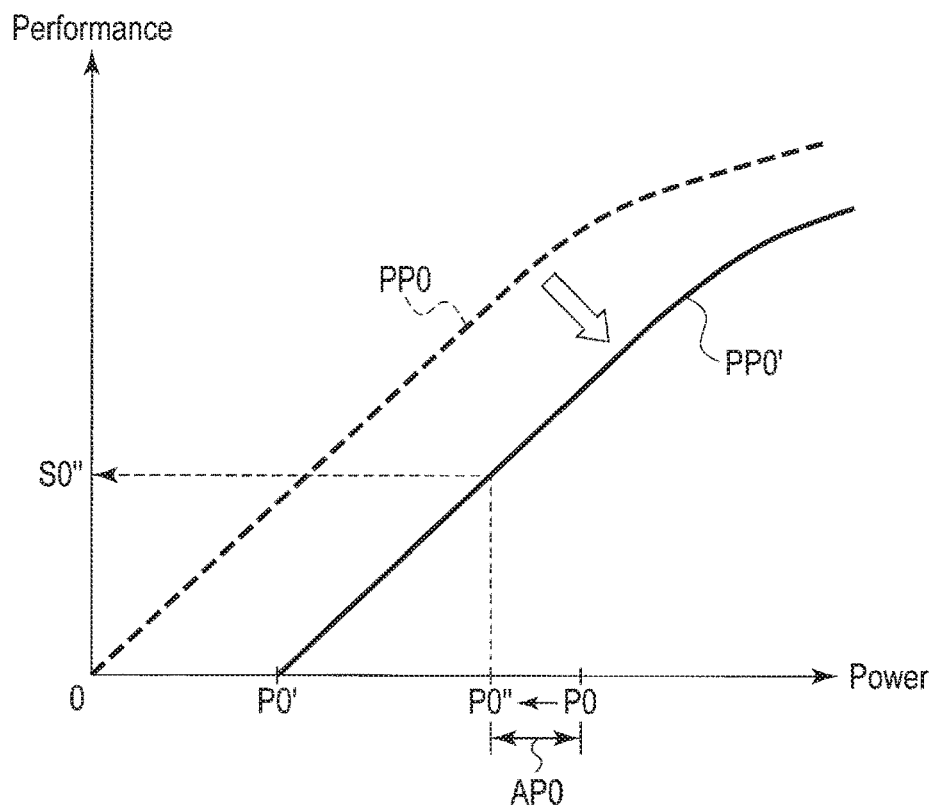
FIG. 6 is a graph showing an example of actual power/performance characteristics of the storage system of the first embodiment.

In step S13, the CPU 22 of the host 20 corrects the power/performance characteristic of each SSD based on the transmitted status signal ReS (P0' to P9'). More specifically, for example, the power distribution determination unit 23 of the host 20 increases the initial value of characteristic PP0 from the origin to P0' based on the status signal ReS (P0') indicative of the minimum power required for the operation of SSD0, as shown in FIG. 6. The power distribution determination unit 23 further corrects characteristic PP0 by performing parallel translation of characteristic PP0 and thereby calculates an actual characteristic PP0'. As described above, the minimum power required for driving components other than the NAND memory 11, for example, the memory controller 12 and the other peripheral circuits can be considered by calculating characteristic PP0'. As a result, the characteristic can be calculated with more precision based on the actual status of each storage device 10. The other characteristics PP1' to PP9' are also calculated in the same manner as PP0'.

In step S14, as shown in FIG. 7, the CPU 22 of the host 20 stores the corrected power/performance characteristics PP0' to PP9' of SSD0 to SSD9 in table T1 and thereby updates table T1. In the following steps S15 and S16, too, the CPU 22 stores calculated allowable power components P0" to P9" and changed power components P0" to P9" in table T1.

In step S15, the power distribution determination unit 23 of the host 20 calculates allowable power components P0" to P4" and P6" to P9" to be distributed to SSDs other than SSD5 under a load, i.e., SSD0 to SSD4 and SSD6 to SSD9, based on the corrected power/performance characteristics PP0' to PP9'. More specifically, as shown in FIG. 6, the power distribution determination unit 23 calculates suppressible power component (surplus power component) P0" from the currently supplied power component P0 based on the corrected characteristic PP0'. "The allowable power (suppressible power, surplus power)" may be any power as long as the NAND memory 11 can continuously operate. The other allowable power components P1" to P9" are calculated in the same manner as allowable power component P0".

In step S16, the power distribution determination unit 23 of the host 20 calculates power component P5" changed to be supplied to SSD5 under a load, from the calculated allowable power components P0" to P4" and P6" to P9". More specifically, as shown in FIG. 6, the power distribution determination unit 23 first calculates differences AP0 to AP4 and AP6 to AP9 between the currently-distributed power components P0 to P4 and P6 to P9 and the calculated suppressible power components P0" to P4" and P6" to P9", respectively. Next, the power distribution determination unit 23 adds the calculated difference power components AP0 to AP4 and AP6 to AP9 to power component P5 assigned to SSD5. As a result, the power distribution determination unit 23 calculates power component P5" (=P5+[AP0 to AP4 and AP6 to AP9]) as the power component changed to be supplied to SSD5.

In step S17, the host 20 notifies each of SSD0 to SSD9, which are the storage devices 10, of the changed power components P0" to P9" (second power) calculated by the host 20 as a power control command. More specifically, at least a first parameter (identification information) to identify SSD0 to SSD9, which are the storage devices 10, and a second parameter (power information) indicative of the changed power components P0" to P9" (second power) are described in the power control command. The first parameter is, for example, ID information uniquely assigned to each of SSD0 to SSD9. In this case, the host 20 checks the ID information and transmits the power control command to each of the storage devices 10 corresponding to the ID information assigned to the status signals ReS.

In step S18, SSD0 to SSD9 operate based on the notified changed power components P0" to P9". More specifically, the power conversion units 13 of SSD0 to SSD9 convert power components P0 to P9 (first power) supplied from the power supply unit 50 into power components P0" to P9" (second power) notified by the memory controllers 12.

As a result, the specified SSD5 operates based on power component P5" (second power) which is greater than the previous power component P5 (first power). The other SSD0 to SSD4 and SSD6 to SSD9 operate based on power components P0" to P4" and P6" to P9" (second power) which have been obtained by subtracting the suppressible power from the previous power components P0 to P4 and P6 to P9 (first power) and are less than the previous power components P0 to P4 and P6 to P9 (first power).

[3. Effect and Advantage]

As described above, according to the structure and operation of the storage system 100 of the first embodiment, at least the following effect (1) can be achieved.

(1) The efficiency of the system can be improved.

Figure 5:
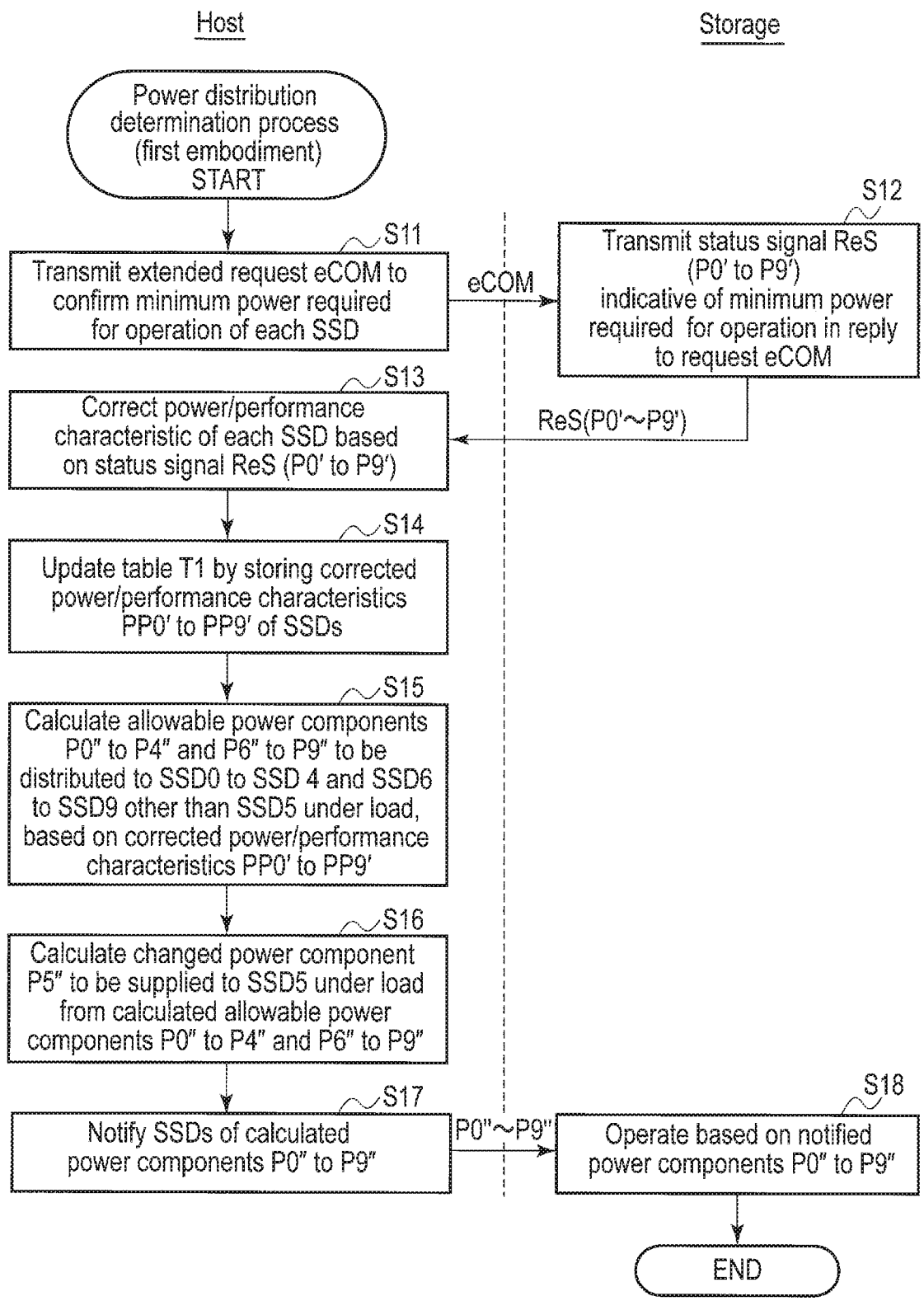
FIG. 5 is a flowchart showing a power distribution determination process of the first embodiment.

For example, if the host 20 determines that the larger load (larger power) is necessary for a specified SSD5, the host 20 transmits an extended command eCOM to ascertain the status and characteristic (in this case, the minimum power) of each of SSD0 to SSD9 (S11 in FIG. 5). Next, when receiving the command eCOM, each storage device 10 transmits a status signal ReS (P0' to P9') indicative of the minimum power required for the operation to the host 20 in reply (S12 in FIG. 5). The host 20 corrects power/performance characteristics of SSDs based on the status signals ReS (P0' to P9') and calculates the changed power components P0" to P9" from the corrected characteristics PP0' to PP9' (S13 to S16 in FIG. 5). After that, the storage devices 10 operate based on the calculated changed power components P0" to P9".

According to the above-described structure and operation, the efficiency of the whole storage system 100 can be improved by intensively injecting allocatable power to SSD5 under a load to improve the processing capacity of SSD5.

Figure 8:
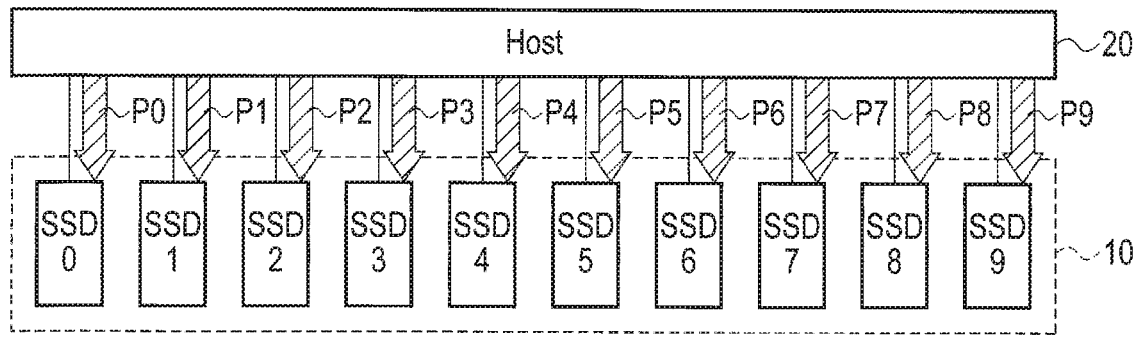
FIG. 8 is a view showing power distribution to be changed.

For example, before the power is changed, SSD0 to SSD9 operate based on power components P0 to P9 almost evenly distributed under the control of the host 20 as shown in FIG. 8. If the total amount of power Pmax supplied to the storage system 100 is predetermined as expressed by expression (I), it is not necessarily preferable to evenly distribute power components P0 to P9 to SSD0 to SSD9 assuming that the maximum performance should be provided by the limited power Pmax. This is based on the premise that the performance of the storage devices 10 varies depending on the power consumption as shown in FIG. 4 and FIG. 6. For example, when a group of servers, which are the external devices 220, accesses the same SSD5 as described above and stores and refers to data of the application, etc., SSD5 is intensively accessed and is required to perform a large amount of processes.

Figure 9:
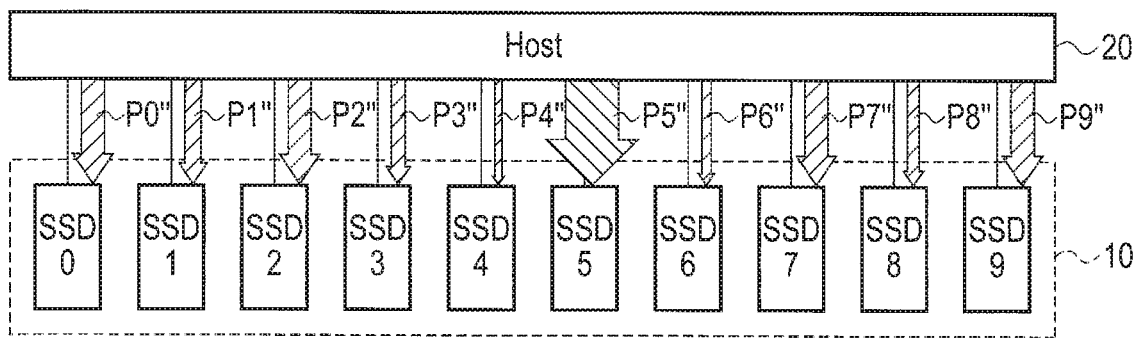
FIG. 9 is a view showing changed power distribution.

Therefore, as shown in FIG. 9, the power is changed to increase the power supplied to SSD5. SSD5, which requires the larger power, can thereby operate based on the larger power component P5". The other SSD0 to SSD4 and SSD6 to SSD9 can continuously operate based on power components P0" to P4" and P6" to P9" obtained by subtracting the suppressible power.

Figure 10:
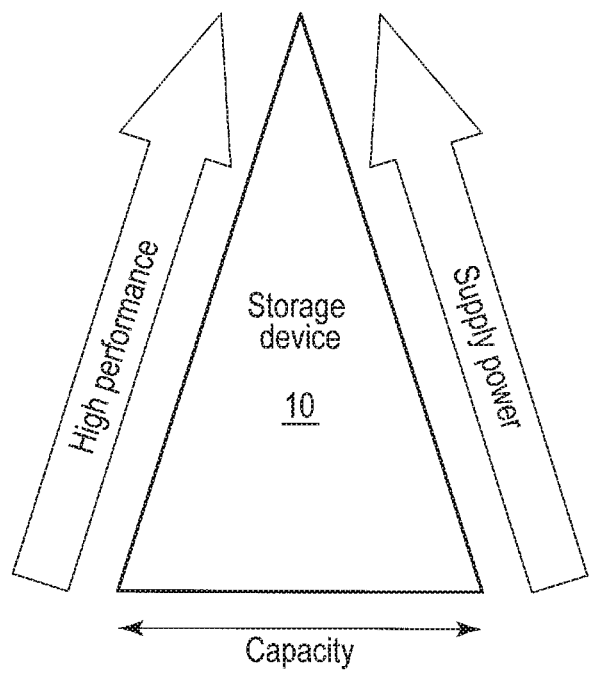
FIG. 10 is a view schematically showing a storage architecture of the first embodiment.

As a result, according to the first embodiment, the processing capability of the storage devices 10 can be substantially hierarchical based on the supplied amount of power as shown in FIG. 10 even if the system is constituted by one type of storage devices 10. More specifically, with respect to data required to be frequently accessed (in this case, data stored in SSD5), the supplied power is increased and the processing ability and speed are improved. As described above, the storage system 100 of the first embodiment has an advantage that an arbitrary storage device 10 can be used as a high-speed layer (higher layer) and the efficiency of the whole system can be improved.

Figure 11:
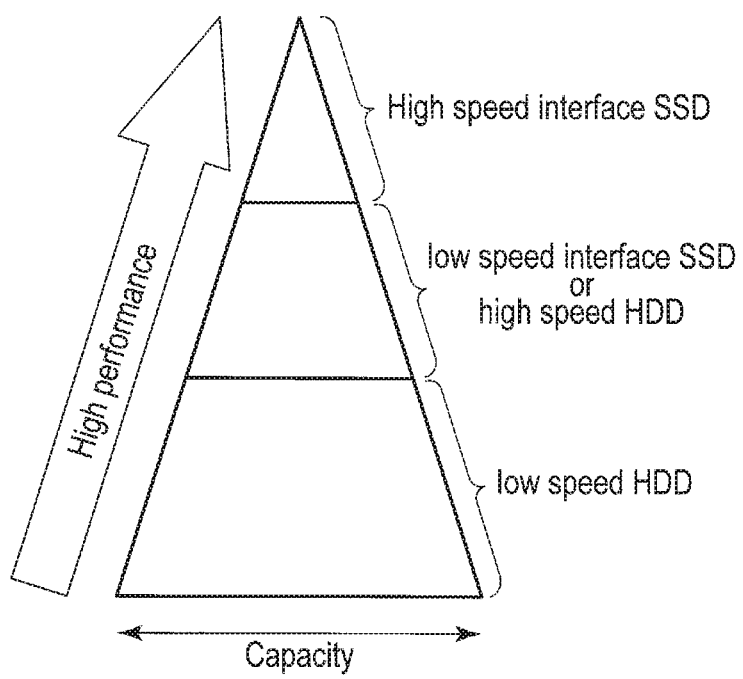
FIG. 11 is a view schematically showing a storage architecture of a comparative example.

In contrast to the first embodiment, a comparative example has a hierarchical structure constituted by several types of storage devices as shown in FIG. 11. For example, a high-speed interface SSD is used as a high-speed layer (higher layer). For example, a low-speed interface SSD or a high-speed HDD is used as a medium-speed layer (medium layer). For example, a low-speed HDD is used as a low-speed layer (lower layer).

In the hierarchical storage architecture as in the comparative example, however, physical device and interface are different depending on layer. Therefore, it is impossible to increase the speed of a specified storage device. In addition, even if data required to be frequently accessed is stored in the high-speed layer (higher layer), accesses do not necessarily center on only the data stored in the higher layer. As described above, the storage system of the comparative example has a disadvantage that the efficiency of the whole system is hardly improved after forming the hierarchical structure.

Second Embodiment [Case where Storage Device Determines its Own Performance]

Figure 12:
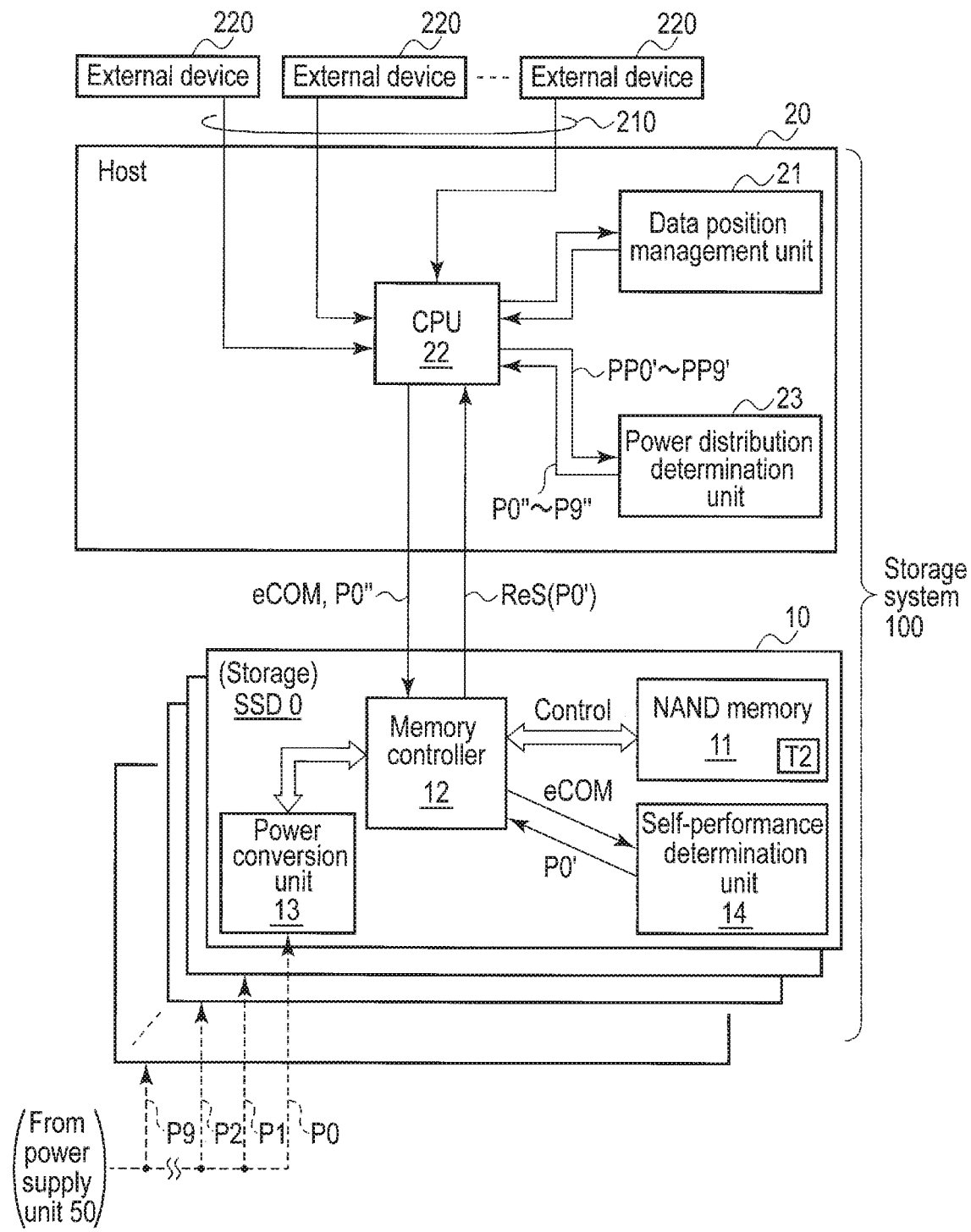
FIG. 12 is a block diagram showing a detailed structure of a storage system of the second embodiment.
Figure 13:
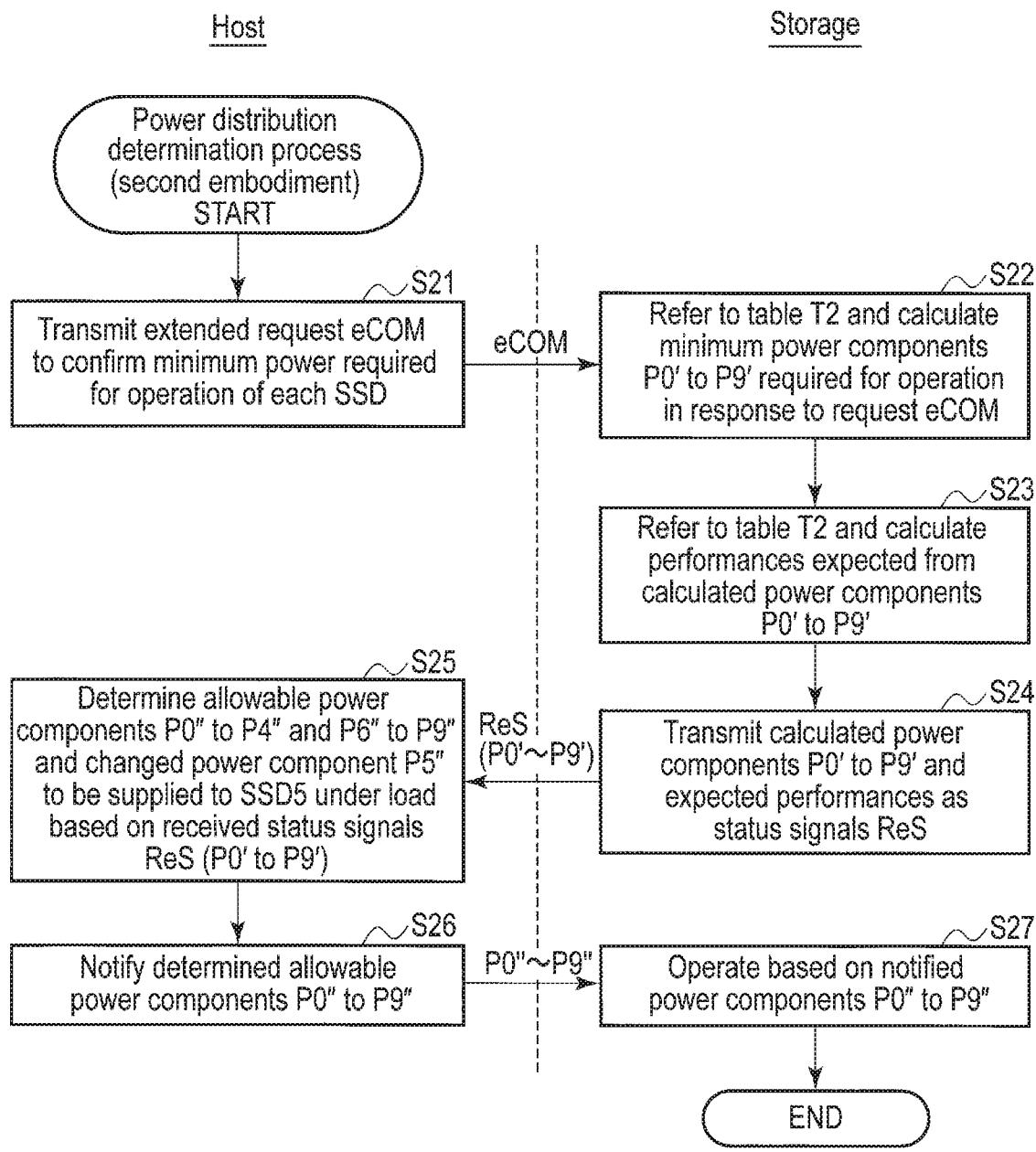
FIG. 13 is a flowchart showing a power distribution determination process of the second embodiment.

Next, the second embodiment is described with reference to FIG. 12 and FIG. 13. The second embodiment relates to a case where each storage device 10 determines its own performance. In the description below, the description overlapping the first embodiment is omitted.
[Structure]
[Storage System]

The detailed structure of the storage system 100 of the second embodiment is described with reference to FIG. 12. As shown in FIG. 12, the storage system 100 of the second embodiment is different from that of the first embodiment in that the NAND memory 11 comprises a table T2 and each storage device 10 comprises a self-performance determination unit 14.

In table (second table) T2 of the NAND memory 11, an actual characteristic (PP0' to PP9') of the storage device 10 is stored. For example, actual characteristic PP0' of SSD0 is stored in table T2 of SSD0. Table T2 is updated by the memory controller 12 at arbitrary intervals. The storage location of table T2 is not limited to the NAND memory 11.

The self-performance determination unit 14 determines the performance of the storage device 10 under the control of the memory controller 12 and notifies the memory controller 12 of a result of the determination. For example, when receiving a command eCOM, the self-performance determination unit 14 of SSD0 refers to table T2 and determines the minimum power component P0' required for the operation of SSD0 based on the actual characteristic PP0'. The self-performance determination unit 14 of SSD0 further notifies the memory controller 12 of the determined power component P0'.

Since the other structure is substantially the same as that of the first embodiment, the detailed description is omitted.
[Operation]
[Distribution Power Determination Process]

A distribution power determination process of the storage system 100 of the second embodiment having the above-described structure is described with reference to FIG. 13. The description below is based on the assumption that a specified SSD5 is intensively accessed by the external devices 220 and the CPU 22 of the host 20 determines that the larger load (larger power) is necessary for SSD5, as an example.

In step S21, the CPU 22 of the host 20 transmits an extended command eCOM to each storage device 10 to detect the minimum power required for the operation of each SSD.

In step S22, in response to the command eCOM, the self-performance determination unit 14 of each storage device 10 refers to table T2 and determines the minimum power component (P0' to P9') required for the operation based on the actual characteristic (PP0' to PP9') stored in table T2.

In step S23, the self-performance determination unit 14 of each storage device 10 refers to table T2 and calculates performance (S0' to S9') expected from the calculated power component (P0' to P9') based on the characteristic (PP0' to PP9').

In step S24, the memory controller 12 of each storage device 10 transmits the calculated power component (P0' to P9') and the expected performance (S0' to S9') to the host 20 as a status signal ReS.

In step S25, the power distribution determination unit 23 of the host 20 determines allowable power components P0" to P4" and P6" to P9" and power component P5" changed to be supplied to SSD5 under a load, based on the received status signals ReS (P0' to P9' and S0' to S9').

In step S26, the CPU 22 of the host 20 notifies the storage devices 10 of the determined power components P0" to P9".

In step S27, the storage devices 10 operate based on power components P0" to P9" notified by the host 20.

Since the other operation is substantially the same as that of the first embodiment, the detailed description is omitted.

[Effect and Advantage]

As described above, according to the structure and operation of the storage system 100 of the second embodiment, at least the same effect as the above-described effect (1) can be achieved. As described in the second embodiment, each storage device 10 may determine its own performance and power consumption.

Third Embodiment [Case where Host Notifies Required Performance]

Next, the third embodiment is described with reference to FIG. 14. The third embodiment relates to a case where the host notifies each storage device 10 of required performance. In the description below, the description overlapping the above-described embodiments is omitted.

[Structure and Operation]

Figure 14:
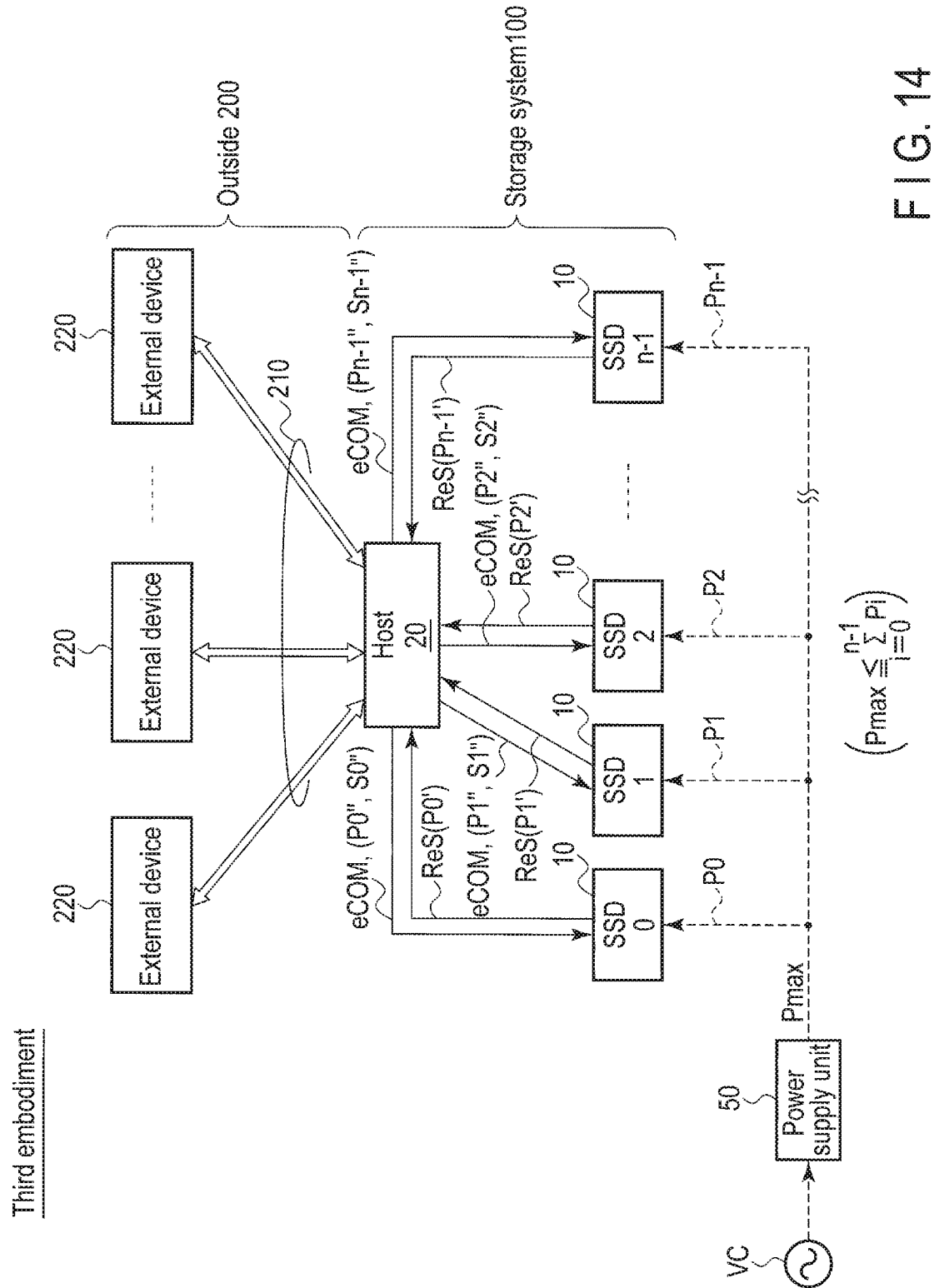
FIG. 14 is a block diagram showing a general structure of a storage system of the third embodiment.

As shown in FIG. 14, the storage system 100 of the third embodiment is different from the first and second embodiments in that the host 20 further notifies each storage device 10 of required performance (S0" to Sn−1"). For example, as shown in FIG. 6, performance S0" is performance expected from the calculated power component P0" based on characteristic PP0'.

More specifically, in steps S14 and S15, the power distribution determination unit 23 of the host 20 calculates power components P0" to P9" based on characteristics PP0' to PP9'. Next, the power distribution determination unit 23 calculates performances S0" to S9" expected from the calculated power components P0" to P9" based on the characteristics PP0' to PP9'. The storage devices 10 are notified of the calculated performances S0" to S9" together with power components P0" to P9".

The host 20 may notify the storage devices 10 of the calculated performances S0" to S9" instead of power components P0" to P9". The performances S0" to S9" may be calculated by the storage devices 10 instead of the host 20.

Since the other structure and operation are substantially the same as those of the first and second embodiments, the detailed description is omitted.

[Effect and Advantage]

As described above, according to the structure and operation of the storage system 100 of the third embodiment, at least the same effect as the above-described effect (1) can be achieved. In addition, according to the third embodiment, the storage devices 10 can be directly controlled based on the required performances S0" to S9". Therefore, each required performance can be achieved more directly.

Fourth Embodiment [Case where Total Amount of Supplied Power is Variable]

Next, the fourth embodiment is described with reference to FIG. 15. The fourth embodiment relates to a case where the total amount of supplied power Pmax is variable. In the description below, the description overlapping the above-described embodiments is omitted.

[Structure and Operation]

Figure 15:
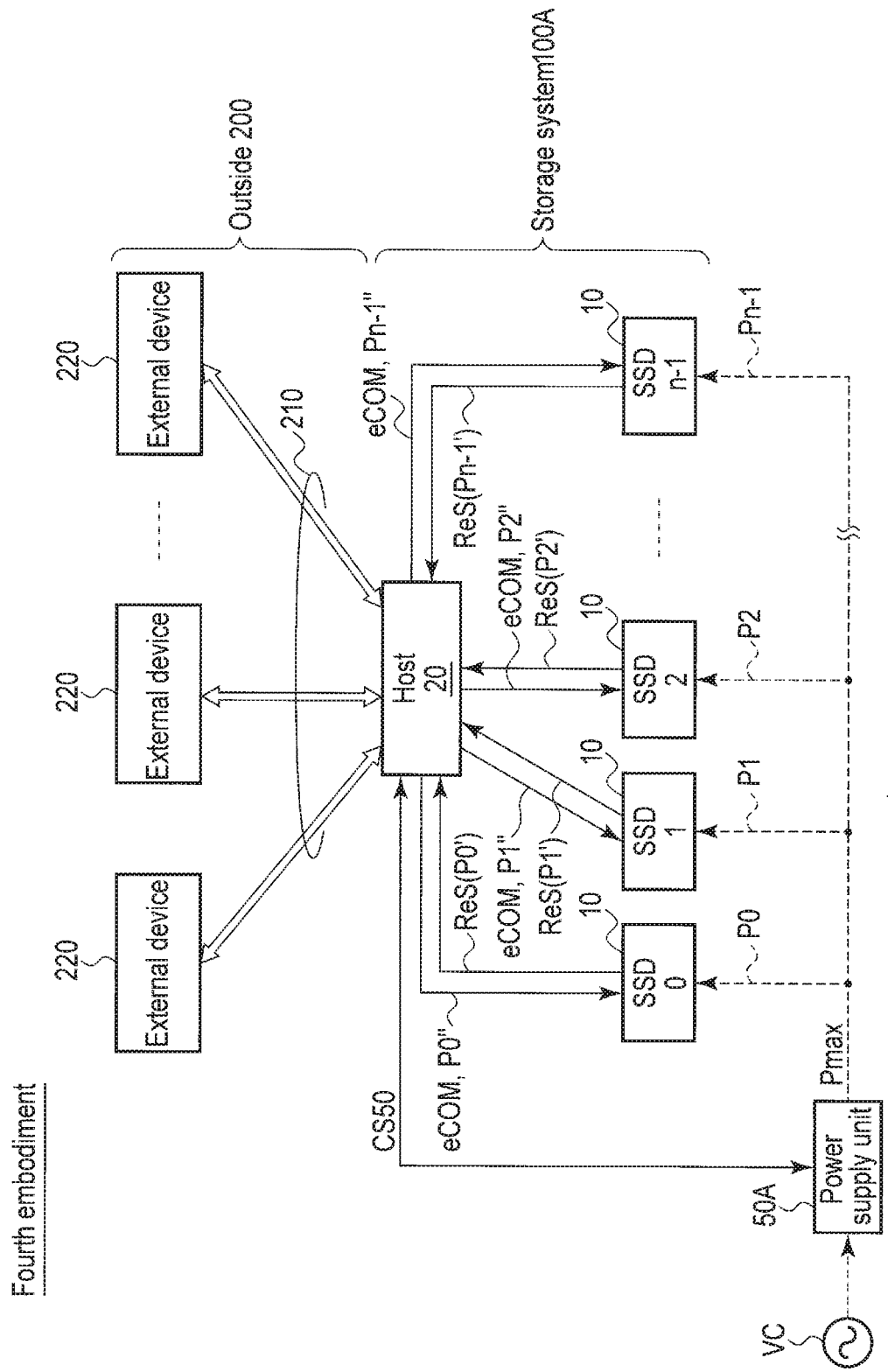
FIG. 15 is a block diagram showing a general structure of a storage system of the fourth embodiment.

As shown in FIG. 15, a storage system 100A of the fourth embodiment is different from the first to third embodiments in that a maximum value of total power Pmax supplied to the storage system 100A can be varied by a control signal CS50 notified to a power supply unit 50A by the host 20.

For example, it is assumed that power supply unit 50A also supplies power to a storage system 100B different from storage system 100A. In such a case, when the operation of storage system 100B is stopped, there is a surplus of power Pmax supplied from power supply unit 50A. Therefore, when detecting the surplus power, the CPU 22 of the host 20 transmits a control signal CS50 to power supply unit 50A to increase the maximum value of power Pmax. When receiving the control signal CS50, power supply unit 50A increases the maximum value of power Pmax and supplies storage system 100A with the increased power under the control of the host 20.

Since the other structure and operation are substantially the same as those of the first to third embodiments, the detailed description is omitted.

[Effect and Advantage]

As described above, according to the structure and operation of the storage system 100 of the fourth embodiment, at least the same effect as the above-described effect (1) can be achieved. In addition, according to the fourth embodiment, the maximum value of total power Pmax supplied to storage system 100A can be changed and the value of power Pmax can be increased by the control signal CS50 notified to the power supply unit 50A by the host 20. Therefore, the fourth embodiment has an advantage that the efficiency of the system can be further improved.

Modified Example 1

The storage system is not limited to the first to fourth embodiments and may be changed as appropriate as described below.

[Structure and Operation]

The power consumption of the storage devices 10 is not necessarily determined by using the power/performance characteristics. For example, as shown in FIG. 16, a table (third table) T3 in which logs (operation history) of SSD0 to SSD9 constituting the storage devices 10 are recorded may be comprised. In table T3, power supplied to each of SSD0 to SSD9 constituting the storage devices and performance achieved by the power are recorded. For example, (501, P01), (S02, P02), . . . are recorded as a log of SSD0. Logs of the other SSD1 to SSD9 are recorded in the same manner. The host 20 or the storage device 10 may determine predetermined power and performance from the characteristic by referring to table T3. Of course, both the characteristics and the logs may be used.

In addition, the first to third tables T1 to T3 are described as an example, but the form is not limited to a table form. For example, a predetermined formula, function and the like may be used.

The means for distributing power is not limited to supplying a specified storage device with surplus allowable power subtracted from the total power Pmax, and may be changed as necessary. For example, the host 20 may distribute power to the storage devices 10 based on the status of all the storage devices 10 such that a specified process at a specified time is completed first.

The power consumed by the storage devices 10 is changed by not only the performance and the operation status of the storage devices 10 but also, for example, the environment (temperature, etc.) of the storage devices 10. Therefore, a temperature and an amount of heat of the storage devices 10 may also be detected as an index of the performance of the storage devices 10.

[Appearance]

Figure 17:
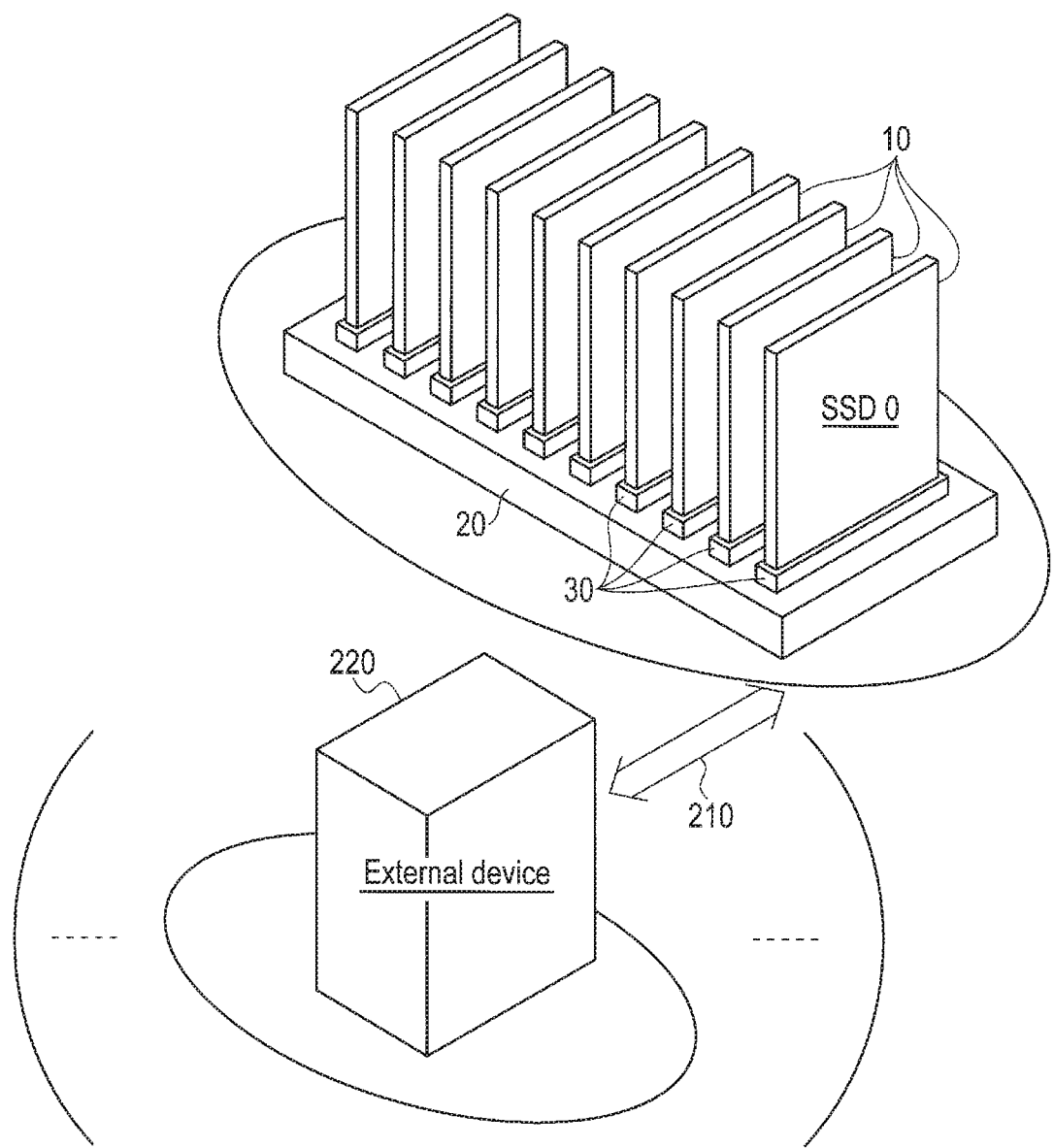
FIG. 17 is a perspective view showing an example of the appearance of the storage system of the first to fourth embodiments and modified example 1.

An example of the appearance of the storage system which can be applied to the first to fourth embodiments and the modified example with reference to FIG. 17.

As shown in FIG. 17, the storage system 100 comprises the storage devices 10 and the host 20 which controls the storage devices 10. SSDs are described as an example of the storage devices 10.

As shown in FIG. 17, for example, the appearance of SSD0 to SSD9, which are the storage devices 10, is a relatively small module. For example, external dimensions of SSD0 to SSD9 are about 120 mm×150 mm. The size and dimensions of SSD0 to SSD9 are not limited to this and may be variously changed as appropriate.

For example, the storage devices 10 can be attached to the host 20 in a data center and a cloud computing system of an enterprise. The storage devices 10 can access an external device 220 such as an external server via the network 210 under the control of the host 20. Therefore, SSD0 to SSD9 may be enterprise SSDs (eSSDs).

For example, the host (host device) 20 comprises connectors (for example, slots) 30 opening upward. The connectors 30 are, for example, Serial Attached SCSI (SAS) connectors, etc. By using the SAS connectors, high-speed communication between the host 20 and each SSD 10 can be performed by a 6-Gbps dual port. The connector 30 is not limited to this and may be, for example, PCI Express (PCIe), NVM Express (NVMe) or the like.

SSD0 to SSD9 are attached to the connectors 30 of the host 20, respectively, and supported side by side while standing in the vertical direction. According to such alignment, SSD0 to SSD9 can be compactly mounted and the host 20 can be downsized. The shape of each of SSD0 to SSD9 is a 2.5-inch small form factor (SFF). By such an SFF shape, SSD0 to SSD9 can achieve a shape compatible with an enterprise HDD (eHDD). Therefore, SSD0 to SSD9 can have easy system compatibility with eHDD.

The use of SSD0 to SSD9 is not limited for enterprises. For example, SSD0 to SSD9 can be of course applied as a storage medium of an electronic device for consumer such as a notebook computer and a tablet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a plurality of storage devices, each of the plurality of storage devices including a nonvolatile memory and a controller configured to control the nonvolatile memory, each of the plurality of storage devices being to be supplied with power from a power supply unit, a value of total power supplied from the power supply unit to the plurality of storage devices being substantially constant; and
a host device configured to control each of the plurality of storage devices in accordance with a request from an external device, and to control distribution of power to the plurality of storage devices, wherein:
the host device is configured to:
obtain a value of minimum power required for an operation of each of the plurality of storage devices;
determine a load of each of the plurality of storage devices; and
when it is determined that one of the plurality of storage devices is to be put under a heavy load, calculate a value of surplus power of each of the other of the plurality of storage devices on the basis of the obtained value of the minimum power, and redistribute power corresponding to the value of the surplus power of each of the other of the plurality of storage devices to the one of the plurality of storage devices,
the host device is configured to transmit a first command to each of the plurality of storage devices, the first command being a command to detect a state of each of the plurality of storage devices;
each of the plurality of storage devices is configured to transmit a status signal to the host device when the first command is received, the status signal being indicative of the value of the minimum power required for the operation of each of the plurality of storage devices;
the host device is configured to calculate an amount of power to be supplied to each of the plurality of storage devices on the basis of the value of the minimum power required for the operation of each of the plurality of storage devices, and to notify each of the plurality of storage devices of the calculated amount of power to be supplied to each of the plurality of storage devices;
each of the plurality of storage devices is configured to operate on the basis of the notified calculated amount of power to be supplied to each of the plurality of storage devices;
the host device includes power/performance characteristic information of each of the plurality of storage devices, the power/performance characteristic information being indicative of a relationship between power supplied to the plurality of storage devices and performance by the plurality of storage devices; and
the host device is configured to
update the power/performance characteristic information of each of the plurality of storage devices on the basis of the value of the minimum power required for the operation of each of the plurality of storage devices, and
calculate the amount of power to be supplied to each of the plurality of storage devices on the basis of the updated power/performance characteristic information of each of the plurality of storage devices.

2. The storage system of claim 1, wherein the host device is configured to calculate the value of the surplus power, by calculating a first value of power of each of the other of the plurality of storage devices, with which a current operation of the nonvolatile memory of each of the other of the plurality of storage devices is continuable.

3. The storage system of claim 2, wherein the host device is configured to calculate the value of the surplus power, by subtracting the first value of power of each of the other of the plurality of storage devices from a second value of currently distributed power of each of the other of the plurality of storage devices.

4. The storage system of claim 1, wherein the host device is configured to obtain the value of the minimum power, by transmitting a first request for confirming the minimum power to each of the plurality of storage devices, and by receiving a status signal indicative of the minimum power from each of the plurality of storage devices, which is transmitted in reply to the first request.

5. The storage system of claim 1, wherein the host device is configured to redistribute the surplus power, by transmitting a power control command for changing a value of supply power of each of the plurality of storage devices to each of the plurality of storage devices.

6. The storage system of claim 5, wherein each of the plurality of storage devices includes a power converter capable of changing the value of the supply power from the power supply unit, on the basis of the power control command.

7. A host capable of controlling a plurality of storage devices, the host comprising:
a plurality of connectors to which the plurality of storage devices are to be connected, each of the plurality of storage devices being to be supplied with power from a power supply unit, a value of total power supplied from the power supply unit to the plurality of storage devices being substantially constant; and
a processing circuit configured to control each of the plurality of storage devices in accordance with a request from an external device, and to control distribution of power to each of the plurality of storage devices, which is supplied with the power from the power supply unit, wherein:
the processing circuit is configured to:
obtain a value of minimum power required for an operation of each of the plurality of storage devices;
determine a load of each of the plurality of storage devices; and
when it is determined that one of the plurality of storage devices is to be put under a heavy load, calculate a value of surplus power of each of the other of the plurality of storage devices on the basis of the obtained value of the minimum power, and redistribute power corresponding to the value of the surplus power of each of the other of the plurality of storage devices to the one of the plurality of storage devices,
the processing circuit is configured to:
transmit a first command to each of the plurality of storage devices, the first command being a command to detect a state of each of the plurality of storage devices;
receive a status signal transmitted from the each of the plurality of storage devices, the status signal being indicative of the value of the minimum power required for the operation of each of the plurality of storage devices;
calculate an amount of power to be supplied to each of the plurality of storage devices on the basis of the value of the minimum power required for the operation of each of the plurality of storage devices transmitted from each of the plurality of storage devices; and
notify each of the plurality of storage devices of the calculated amount of power to be supplied to each of the plurality of storage devices,
the processing circuit includes power/performance characteristic information of each of the plurality of storage devices, the power/performance characteristic information being indicative of a relationship between power supplied to the plurality of storage devices and performance by the plurality of storage devices; and
the processing circuit is configured to
update the power/performance characteristic information of each of the plurality of storage devices on the basis of the value of the minimum power required for the operation of each of the plurality of storage devices, and
calculate the amount of power to be supplied to each of the plurality of storage devices on the basis of the corrected power/performance characteristic information of each of the plurality of storage devices.

8. The host of claim 7, wherein the processing circuit is configured to calculate the value of the surplus power, by calculating a first value of power of each of the other of the plurality of storage devices, with which a current operation of a nonvolatile memory of each of the other of the plurality of storage devices is continuable.

9. The host of claim 8, wherein the processing circuit is configured to calculate the value of the surplus power, by subtracting the first value of power of each of the other of the plurality of storage devices from a second value of currently distributed power of each of the other of the plurality of storage devices.

10. The host of claim 7, wherein the processing circuit is configured to obtain the value of the minimum power, by transmitting a first request for confirming the minimum power to each of the plurality of storage devices, and by receiving a status signal indicative of the minimum power from each of the plurality of storage devices, which is transmitted in reply to the first request.

11. The host of claim 7, wherein the processing circuit is configured to redistribute the surplus power, by transmitting a power control command for changing a value of supply power of each of the plurality of storage devices to each of the plurality of storage devices.

* * * * *